United States Patent [19]

Chu et al.

[11] Patent Number: 4,675,701

[45] Date of Patent: Jun. 23, 1987

[54] VIBRATING THERMAL PRINTING

[75] Inventors: Mosi Chu, Setauket; Kenneth Kress, Huntington; Solomon Manber, Sands Point, all of N.Y.

[73] Assignee: Primages, Inc., Ronkonkoma, N.Y.

[21] Appl. No.: 853,677

[22] Filed: Apr. 18, 1986

Related U.S. Application Data

[63] Continuation-in-part of Ser. No. 767,159, Aug. 19, 1985, abandoned.

[51] Int. Cl.[4] ............................................ G01D 15/10

[52] U.S. Cl. ................................ 346/76 PH; 400/120

[58] Field of Search ....................... 346/76 PH, 139 R; 400/120, 241.2; 219/216 PA; 250/318

[56] References Cited

U.S. PATENT DOCUMENTS

| | | | |
|---|---|---|---|
| 4,046,073 | 9/1977 | Mitchell et al. | 400/241.2 |
| 4,550,324 | 10/1985 | Tamaru et al. | 346/76 PH |

*Primary Examiner*—Arthur G. Evans
*Attorney, Agent, or Firm*—Roberts, Spiecens & Cohen

[57] ABSTRACT

A vibrating thermal printer transfers thermoplastic ink from a ribbon to a record medium by selectively heating resistive elements on a substrate of electrically conductive material. While the record medium and ribbon are passing the print head, the print head, by means of piezoelectric phenomenon, induces vibration in the head to facilitate the deposition of thermoplastic ink onto the paper. There is also shown the preheating of the ribbon to improve throughput.

12 Claims, 3 Drawing Figures

VIBRATING THERMAL PRINTING

REFERENCE TO OTHER APPLICATIONS

This application is a continuation-in-part of application Ser. No. 767,159, filed Aug. 19, 1985, now abandoned.

BACKGROUND OF THE INVENTION

This invention pertains to dot matrix type printing and, more particularly, to dot matrix type printers employing thermal print heads.

At present there are available thermal print heads which are used in dot matrix printing. These print heads comprise effectively miniature resistors which when fed a pulse of current generate enough heat to melt a portion of the ribbon opposite the element. The melted portion is transferred by contact to a record medium such as paper immediately opposite the ribbon. This type of head has several limitations. The main limitation is that the printing rate is slower than some other types of printers because of the thermal inertia. In order to enhance the print rate, people have generally applied very large current pulses to the resistors. However, the use of large current pulses introduces thermal and electrical shocks into the head structure, shortening its life.

BRIEF SUMMARY OF THE INVENTION

It is a general object of the invention to provide an improved thermal printing.

Briefly, the invention contemplates selectively transferring, from a ribbon regions of pigmented thermoplastic material from a base onto a record medium by moving the ribbon past the record medium, selectively heating the desired regions to melt the thermoplastic material in these selected regions and locally vibrating the ribbon to shake off the melted thermoplastic material from such regions of the base.

It is another object of the invention to provide an improved print head.

Briefly, this further aspect of the invention contemplates a thermal/print device having a substrate of nonconductive material with an electrically resistive element fixed to the substrate. There are provided means for inducing the substrate to vibrate along with means for selectively passing electric current through the electrically resistive element.

According to another aspect of the invention, there is provided a print head having a plurality of print elements with each print element being a resistive ribbon printed on a nonconductive substrate. The substrate per se or an element coupled thereto is of piezoelectric material. There is applied to the piezoelectric material a continuously varying electric field to cause small amplitude vibrations in the substrate. Thus, when current is applied to the resistive material, heat is generated. The combination of the application of heat and the vibration should enhance the transfer of thermoplastic ink from the ribbon to the record medium.

BRIEF DESCRIPTION OF THE DRAWING

Other objects, features and advantages of the invention, will be apparent from the following detailed description when read in conjunction with the accompanying drawing wherein.

DETAILED DESCRIPTION OF THE INVENTION

Figure 1:
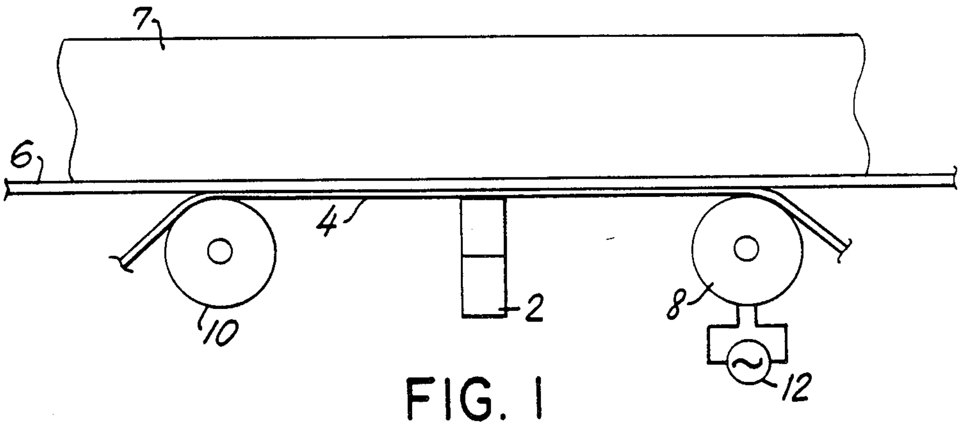
FIG. 1 is a top view of a print head opposite a thermoplastic ribbon which presses against a record medium according to one embodiment of the invention.

In FIG. 1, there is shown a printer 2 whose face presses against a ribbon 4 of thermoplastic ink. The ribbon is of the solid ink transfer type having a base film opposite the print head 2, a peeling layer disposed on the base film and a non-wax type ink layer resisting on the peeling layer. The ribbon 4 also presses against a record medium 6 such as rough paper resting against a platen 7. In general, there is movement of the print head with respect to the ribbon 4 and the record medium 2, but there is no relative movement between the ribbon 4 and the record medium 2. The ribbon may be in a cassette having a supply reel, not shown, a supply pulley 8, a take-up pulley 10 and a take-up reel, not shown. It may be desirable to improve the rate of printing to pre-heat the ribbon. This can be accomplished by making the feed pulley 8 a heated pulley, i.e., by incorporating a heating element therein and supplying the heating element with current from a source 12. Then, as the pre-heated ribbon moves opposite the print head 2, the print head 2 will be energized to perform dot matrix type printing.

Figure 2:
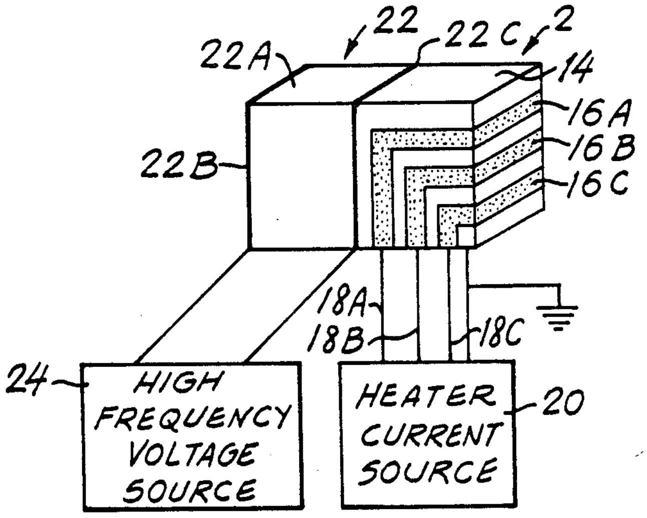
FIG. 2 is a perspective view partially in schematic of the print head of FIG. 1.

In FIG. 2 is shown a perspective view of a print head 2. In the embodiment of FIG. 2, the print head is shown including a substrate 14 having printed therein a plurality of resistive elements 16*a*, 16*b* and 16*c*. (It should be noted that the number of resistive elements is merely representative. It should also be noted that for the sake of clarity, the resistive elements are shown greatly out of scale. In fact, the elements are small enough so that they will merely print the equivalent of dots.) In any event, the elements 16 each have one end connected via a lead 18 to a heater current source 20 and another end grounded. The heater current source 20 can be a current source which is connected via switching means to each of the leads 18. The switching means can selectively connect any one of the leads to the current source. In this way, selective dots can be printed.

Furthermore, the substrate 14 is bonded to piezoelectric element 22. The piezoelectric element 22 has a substrate 22*a* of piezoelectric material such as barium titanate. Fixed to opposed faces of the substrate 22*a* are electrodes 22*b* and 22*c*. The electrodes are connected to a high-frequency voltage source 24. The source 24. operating through the electrodes 22*b* and 22*c* causes the lengthwise vibration in the piezoelectric substrate 22*a*. This vibration is carried over into the substrate 14 of the print element portion. Thus, the entire print head 22 is continuously vibrating with low amplitude and high frequency in the direction of the ribbon. Accordingly, when selective resistive elements 16 are heated, the combination of the heat and the vibration will facilitate the depositing of "dots" of ink from the ribbon onto the record medium 6.

Figure 3:
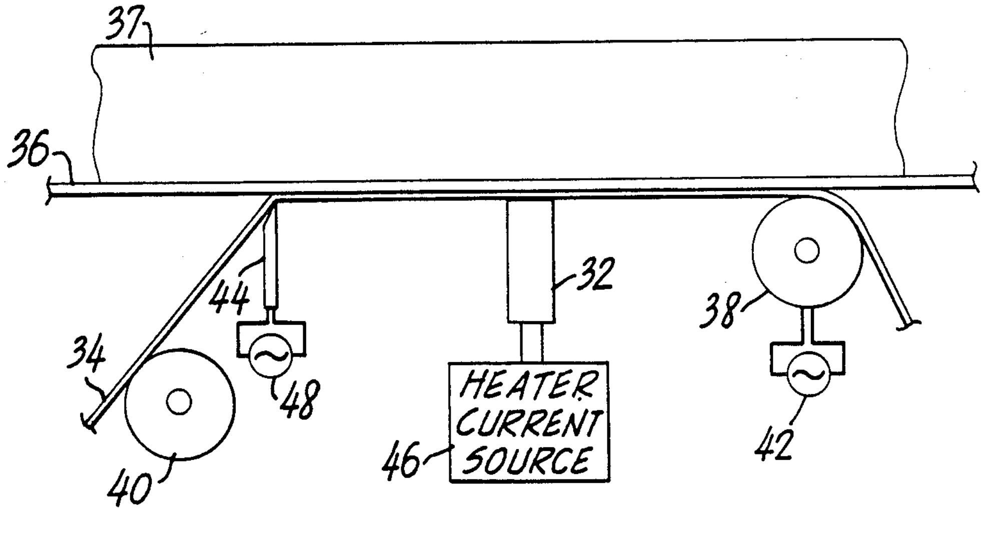
FIG. 3 is a top view of a print head and vibrating wedge element opposite a thermoplastic ribbon which is opposite a record medium in accordance with another embodiment of the invention.

In FIG. 3, there is shown a print head 32 whose face presses against the ribbon 34 of the thermoplastic ink opposite record medium 36 resting against the platen 37. The ribbon is the same as the ribbon 4 of FIG. 1.

The ribbon 34 may also be in a cassette having a supply reel, not shown, and a supply pulley 38, a take-up pulley 40 and a take-up reel, not shown. It may be desirable to improve the rate of printing to pre-heat the ribbon. This can be accomplished by making the feed pulley 38 a heated pulley, i.e., by incorporating a heating element therein and supplying the heating element with current from a source 42. Then, as the pre-heated ribbon moves opposite the print head 32, the print head 2 will be energized to perform dot matrix type printing.

The ribbon 34 after moving past the head 32 moves over vibrating wedge 44, a piezoelectric element energized to vibrate by source 48. Since vibration to shake off the molten ink is performed by wedge 44, the print head 32 can be a conventional thermal print head selectively energized by source 46 as in FIG. 1. In order to compensate for any heat loss in the ribbon on its travel to and over wedge 44, the wedge can be heated by energizing a resistive element thereon. In any event the peeling angle should be 45° and 75°.

There has thus been shown an improved thermal printing which because of the vibration of the ribbon requires lower amplitude heating pulses into the respective resistance elements. Again, the use of pre-heating will further lower the amplitude of the current pulses and consequently raise the printer throughout and increase the life of the print head.

While only a limited number of embodiments have been shown and described in detail, there will now be obvious to those skilled in the art many modifications and variations satisfying many and all of the objects of the invention while not departing from the spirit thereof.

In particular, it is possible to make the entire substrate piezoelectric material to provide a unitary structure for the print head. It is also possible to use a different configuration of the piezoelectric such as piezoelectric bender.

What is claimed is:

1. The method of selectively transferring, from a ribbon, regions of pigmented thermoplastic material on a base onto a record medium comprising the steps of moving the ribbon past the record medium, selectively heating desired regions to melt the thermoplastic material in these selected regions, said selective healing taking place at one position with respect to the record medium and locally vibrating the ribbon to shake off the melted thermoplastic material from said regions of the base said vibrating taking place at another position with respect to the record medium downstream in the direction of movement of said ribbon.

2. The method of claim 1 wherein between said first and second positions said ribbon is moved parallel to said record medium and bending said ribbon away from said record medium as it moves past said second position.

3. The method of printing on a record medium comprising providing a ribbon having a substrate of inert material upon one surface thereof being a layer of thermoplastic ink, positioning the ribbon opposite the record medium such that the layer of thermoplastic ink is against the record medium, preheating the ribbon at a first position moving the record medium and ribbon with no relative movement therebetween to a second position, at the same position selectively heating dot regions of the substrate whereby dot regions of the layer of thermoplastic ink are softened, and vibrating the area of the ribbon having the softened thermoplastic ink for inducing the dot regions of the softened thermoplastic ink to adhere to the record medium.

4. The method of claim 3 wherein said heating and vibrating steps are performed simultaneously by a common means.

5. The method of claim 3 wherein said heating step is performed at one position and further comprising the step of moving the record medium and ribbon with no relative movement therebetween to another position where the vibrating step is performed.

6. The method of claim 5 further comprising the step of at said other position peeling the ribbon away from the record medium.

7. A thermal printer for printing on a record medium comprising: a ribbon having a base and a layer of thermoplastic ink on said base; means for supporting the ribbon so that the layer of thermoplastic ink is against the record medium; a thermal print head positioned against the base means for energizing said print head to produce selective dot regions of heat on said ribbon for softening corresponding regions of the layers of thermoplastic ink said energizing means comprising a substrate of non-conductive mateiral, an electrically resistive element fixed to said substrate and means for selectively passing electric current through said electrically resistive element and vibrating means for vibrating the ribbon whereby the softened regions of thermoplastic ink are transferred to the record medium.

8. The thermal printer of claim 7 wherein said vibrating means is a piezoelectric element.

9. The thermal printer of claim 7 wherein said piezoelectric element is wedge shaped facing said ribbon.

10. The thermal printer of claim 7 wherein said piezoelectric element is heated.

11. The thermal printer of claim 7 wherein said energizing means and said vibrating means are a unitary structure.

12. The thermal printer of claim 7 further comprising a wedge shape means facing said ribbon for peeling the base from softened thermoplastic ink in contact with the second medium.

* * * * *